UNITED STATES PATENT OFFICE.

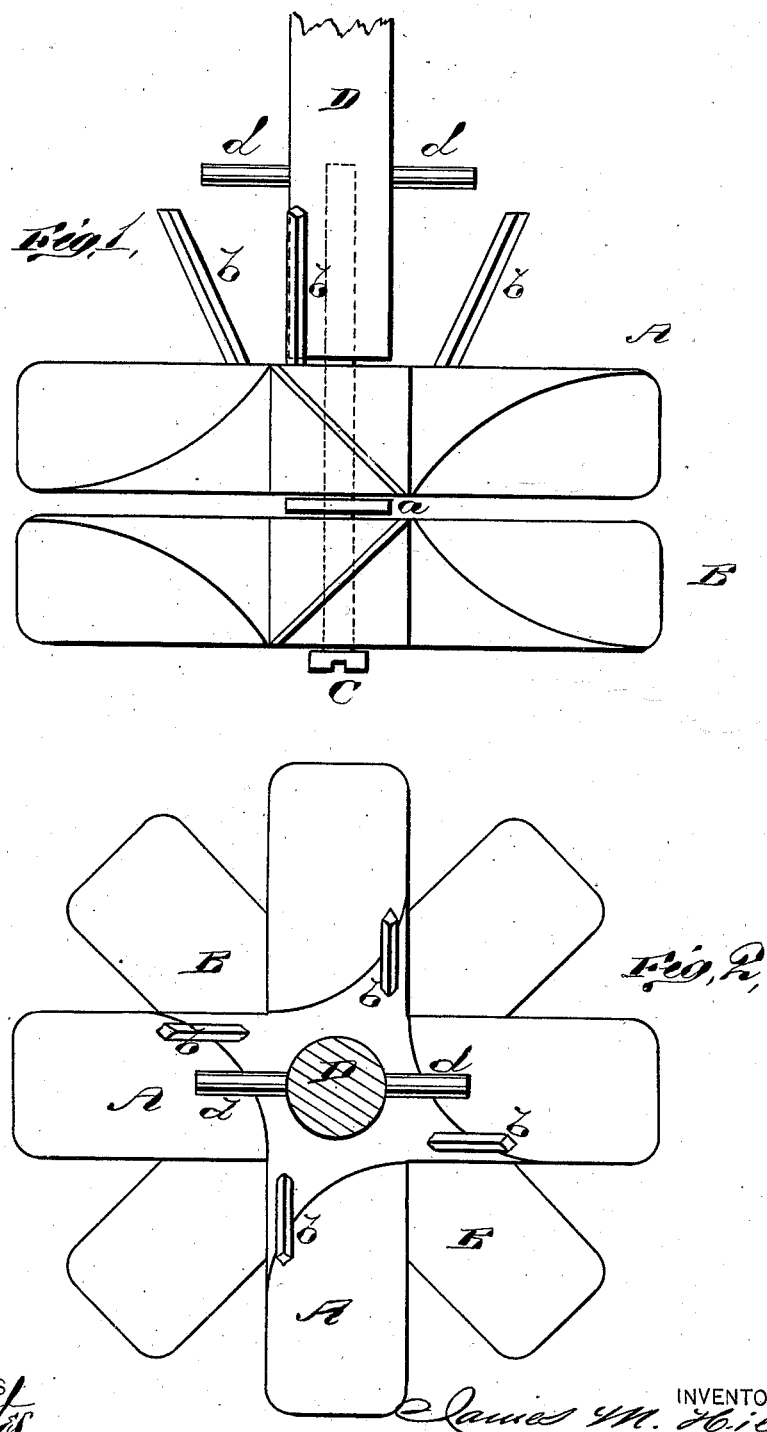

JAMES M. HILL, OF CISNE, ILLINOIS.

IMPROVEMENT IN CHURNS.

Specification forming part of Letters Patent No. 199,547, dated January 22, 1878; application filed October 20, 1877.

*To all whom it may concern:*

Be it known that I, JAMES M. HILL, of Cisne, in the county of Wayne and State of Illinois, have invented a new and valuable Improvement in Churn-Dashers; and I do hereby declare that the following is a full, clear, and exact description of the construction and operation of the same, reference being had to the annexed drawings, making a part of this specification, and to the letters and figures of reference marked thereon.

Figure 1 of the drawings is a side view of my churn-dasher, and Fig. 2 a sectional plan view of the same.

The nature of my invention consists in the construction and arrangement of a vertically-reciprocating churn-dasher, as will be hereinafter more fully set forth.

The annexed drawings, to which reference is made, fully illustrate my invention.

A and B represent the two dashers, each of which is made of two pieces, halved into each other in the center at right angles, the ends of said pieces forming inclined or twisted blades, somewhat similar to the blades of a propeller. The arms or blades of the two dashers A B are inclined in opposite directions, as shown, and the two dashers are connected by a central screw, C, to the lower end of the dasher-rod D.

Between the two dashers, on the screw C, is placed a washer, $a$, to separate the dashers and prevent them from interfering with each other as they rotate upon the screw.

As the dashers descend into the milk they revolve in opposite directions, creating counter or opposing currents; and as the dashers are raised their motion is reversed, creating other counter-currents, and by the rapid up-and-down motion of the dashers the globules of the milk are quickly broken and the butter separated.

The top dasher A has a series of pins, $b\ b$, projecting from its upper side. Said pins stand in a more or less inclined position, and assist in cutting and separating the milk, and they also act as gatherers of the butter.

To still further increase the efficiency of the churn-dasher, the rod D is provided with two or more horizontally-projecting arms or pins, $d\ d$, as shown.

The dashers A B can easily be removed, when required for cleaning, by simply unscrewing the screw C, and then quickly replaced.

What I claim as new, and desire to secure by Letters Patent, is—

1. The inclined pins $b$, projecting from the upper surface of the dasher A, in combination with the dasher B, screw C, and handle D, substantially as and for the purposes herein set forth.

2. The handle or rod D, provided with the horizontal arms or pins $d\ d$, in combination with the dashers A B, pins $b$, and screws C, substantially as and for the purposes herein set forth.

In testimony that I claim the above I have hereunto subscribed my name in the presence of two witnesses.

JAMES M. HILL.

Witnesses:
BEN. F. CHANEY,
JOHN L. STRYCKERS.